April 28, 1931. J. H. BAUMGARTNER 1,802,455
PROCESS OF PASTEURIZING DAIRY PRODUCTS
Filed Dec. 10, 1928
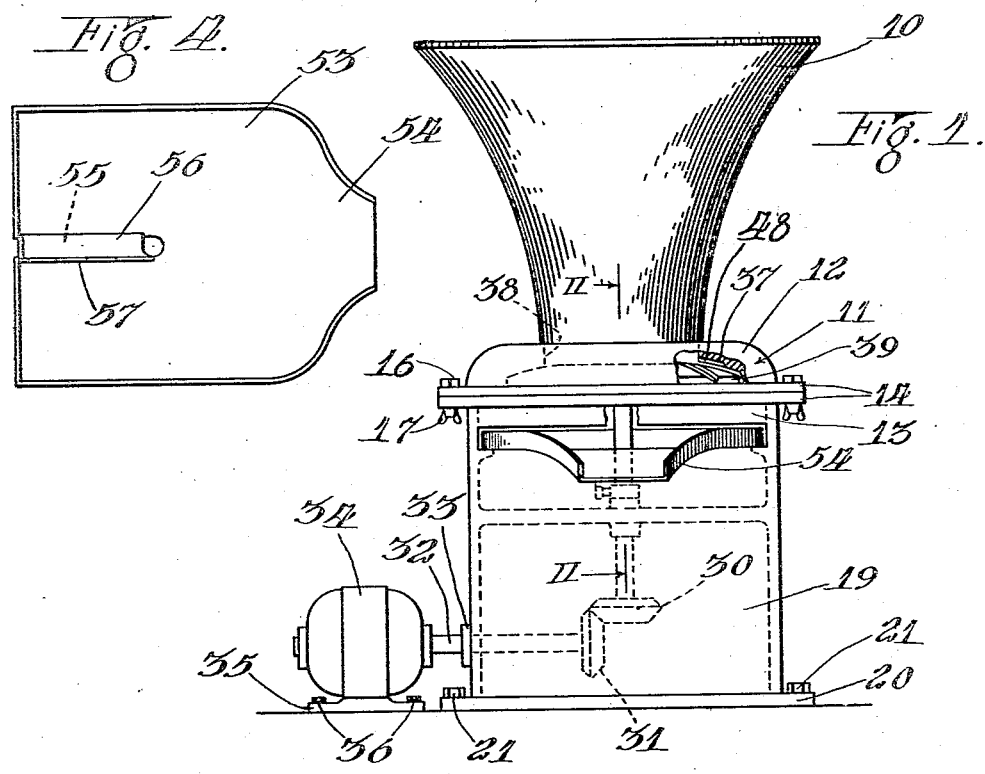
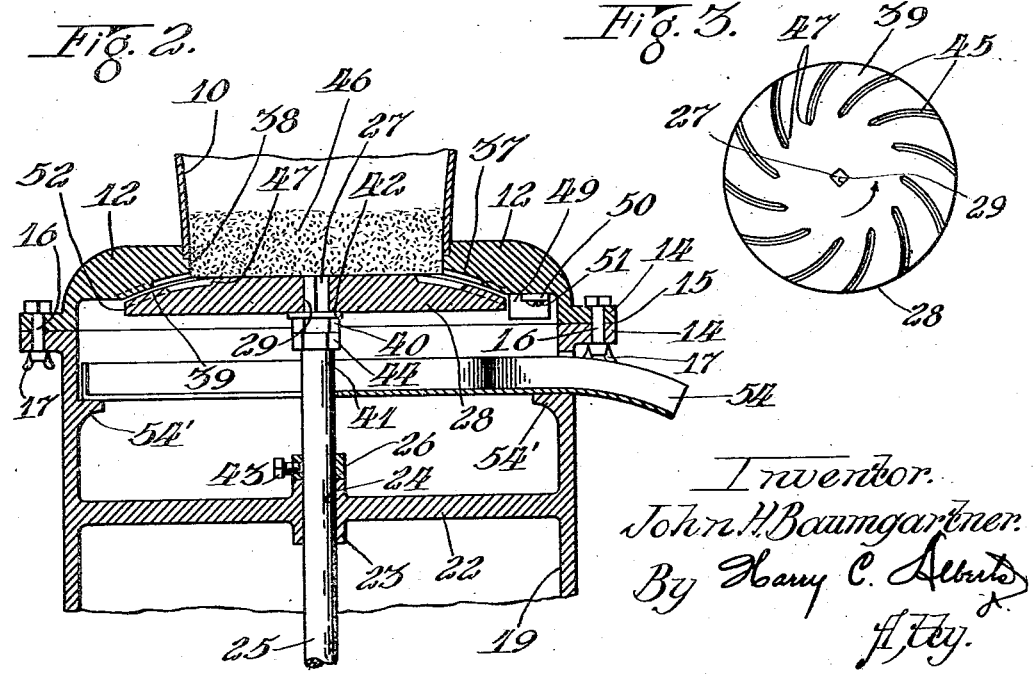
Inventor.
John H. Baumgartner.
By Harry C. Alberts
Atty.

Patented Apr. 28, 1931

1,802,455

UNITED STATES PATENT OFFICE

JOHN H. BAUMGARTNER, OF CHICAGO, ILLINOIS, ASSIGNOR TO CHARLES DOERING AND HENRY DOERING, BOTH OF CHICAGO, ILLINOIS

PROCESS OF PASTEURIZING DAIRY PRODUCTS

Application filed December 10, 1928. Serial No. 324,892.

This invention relates to improved dairy products and their pasteurization, although certain features thereof may be employed with equal advantage for other purposes.

It contemplates more especially the provision of a novel process for pasteurizing dairy products without resort to extraneous heat which tends to effect disintegration or separation of the butter fat from the casein.

Dairy products such as cheese, butter and kindred edible plastics are customarily pasteurized by the subjection thereof to elevated temperatures prior to packaging. Pasteurization tends to preclude or at least retard deterioration occasioned by bacteria infestation responsive to natural bacteria decay over an extended period of time.

Fundamentally, the difficulty of sterilizing cheese or other dairy products with heat is the inability to prevent disintegration of the constituents or the separation of the butter fat from the casein, thereby destroying the homogeneity thereof. It has long been the practice, therefore, of employing mechanical agitators and stirring implements during heat sterlization to prevent disintegration, but such expedients require skilled supervision and constant regulation not always productive of uniformity.

As a consequence the known methods of pasteurization require the subjection of the dairy products to heat supplied from some extraneous source, have not acquired perfection from both the standpoint of production costs and uniformity in the resulting product. The present invention departs entirely from known processes in that heat of pasteurization is produced incident to the processing of dairy products in a manner to insure a homogeneous condition and increased smoothness of texture without skilled supervision, constant regulation or possible disintegration.

Moreover, edible dairy plastics are kept intact by the adhesive character of the adjacent particles, and the quality thereof depends upon the complete homogeneity and uniform blending of the butter fat and casein together with the other constituents thereof in that such masses are otherwise subject to variations in richness and texture in regions of improper association of the constituents, along lanes of casein separation or where variations arise from other irregularities incident to processing to effect sterilization. Deficiencies of this character not only are detectable to the taste, but also present coarse grained regions or discolorations in an improperly or non-uniformly processed cheese mass. It has been found advantageous, therefore, to treat dairy plastics so as to render scorching, disintegration or casein separation impossible in its critical or sterilized condition during processing, especially of cheese which is not sufficiently stable in certain ranges of heat treatment for successful uniform mass assimilation and retention under chilling or normal room temperatures to produce a high quality and enriched edible product having a uniform velvety texture.

Dairy products are especially appetizing when possessing a fine velvety consistency in that such possess a decidedly improved taste owing to the complete homogenized condition thereof which results from processing in accordance with the teachings of the present invention. The keeping qualities, taste and physical characteristics thereof are enhanced even more by the pressure subjection of successive small constituent increments to the end of imparting an accentuated velvety consistency to the natural plastic product having, as a result, a more desirable flavor and improved consuming characteristics appealing to the taste.

One object of the present invention is the provision of a novel process of pasteurizing dairy products which insures complete homogeneity without substantially uncontrolled variations.

Another object is to effect pasteurization incident to the processing of dairy products without resort to extraneous heat.

Still another object is the provision of a process resulting in an improved dairy product having a superior flavor and a uniform velvety consistency.

A further object is the provision of an improved edible plastic resulting from the thorough uniform processing of every increment thereof constituting the mass.

Still a further object is to provide a novel method of processing edible dairy plastics to improve the preserving and taste qualities thereof.

Still a further object is the provision of a novel method of processing cheese to impart complete homogeneity, sterility and uniform texture thereto.

An additional object is to provide a novel process of sterilizing cheese without any possible disintegration or separation of the constituent elements thereof.

Other objects and advantages will appear from the following description of an illustrated embodiment of the present invention.

In the drawing:

Figure 1 is a fragmentary sectional view in elevation of a device capable of performing a process embodying features of the present invention.

Figure 2 is a sectional view taken substantially along line II—II of Figure 1.

Figure 3 is a plan view of the rotor shown in Figure 2.

Figure 4 is a fragmentary plan view of a substance receiving pan employed in connection with the device shown in Figure 1.

A process of pasteurization selected for illustrating the teachings of the present invention comprises the processing of edible substances such as butter, cheese, and kindred plastics produced by churning or other customary practices. Pasteurization or sterilization thereof is deemed proper and necessary for the purpose of rendering such products sterile prior to confinement in containers, for commercial distribution, since these dairy plastics are otherwise subject to rapid deterioration without resort to sterilization.

To this end, edible plastics are either taken directly from the churn or storage where aging is permitted to impart a predetermined strength thereto or in the instance of butter to effect preserved freshness under reduced temperatures, and then directed through a constriction to create heat of pasteurization. In the case of cheese or other hardened plastics, the mass is ground or otherwise shredded prior to the subjection thereof to a physical pressure reaction which elevates the temperature for direct subjection thereto.

The heat of sterilization developed mechanically, in this instance incidental to the passage of dairy plastics such as cheese through a constriction, effectively pasteurizes the substances during the movement thereof along a predetermined path. This may be accomplished by passing the edible plastics in a comminuted condition through a constriction of any type where heat will be evolved as a consequence thereof. No particular apparatus is essential, but to clarify the disclosure, reference is directed to a structure selected merely for illustration, there being shown a hopper 10, in this instance of frusto-conical configuration for directing the passage of edible dairy plastics into a casing 11 communicating therewith.

The casing 11 is preferably composed of split sections 12 and 13 terminating in confronting flanges 14 integrally or otherwise associated therewith. The flanges 14 are provided with aligned apertures 15 spaced uniformly about the circumferential periphery thereof to receive carriage bolts 16 therethrough. The carriage bolts 16 are provided with wing threaded nuts 17 in engagement therewith to secure the sections 12 and 13 together as well as enable the ready disassociation thereof for cleansing and replacement purposes.

The section 13 extends downwardly to define a standard 19 having an integral or other foundation engaging flange 20 formed thereon to receive studs 21 therethrough for effecting the fixed association thereof to a permanent object. The standard 19 has a transverse web 22 formed integrally therein to carry a bearing 23 disposed centrally of the casing 19 to provide a vertically extending bore 24 axially therethrough. A shaft 25 is journalled in the bore 24, there being a sleeve 26 secured thereto to rest on the bearing 23 for preventing longitudinal movement of the shaft 25.

The shaft 25 extends upwardly to terminate in a polygonal extension 27, in this instance of rectangular cross section to slidably receive a rotor or disc 28 thereon. The disc 28 is provided with an axial bore 29 corresponding in shape with the extension 27 so as to rotate in unison with the shaft 25. The other extremity of the shaft 25 is provided with a bevel gear 30 which meshes with a correspondingly shaped gear 31 mounted on a horizontal shaft 32 projecting through a bearing 33 carried by the standard 19 on one side thereof. As shown, the shaft 32 constitutes in this instance the armature of an electrical motor 34 which has the casing thereof provided with flanges 35 attached to receive fasteners 36 therethrough for effecting the rigid association thereof to a fixed foundation; however other power means may be harnessed to the shaft 32 for the purpose of imparting rotary movement thereto.

In order to effect the traverse of the edible plastics confined in the hopper 10 through a constriction for creating heat of pasteurization incident to the travel thereof, the casing section 12 is provided with an inner arcuate surface 37 extending between the discharge orifice 38 of the hopper 10 and a point proximate to the flange 14 thereof. The arcuate annulus or surface 37 cooperates with a corresponding surface 39 formed on the rotor or disc 28 in confronting relation therewith, it being noted, however, that the curvature of the surface 39 of the rotor 28 extends beyond the mouth 38 of the hopper 10 to the polygonal axial bore 29 of the rotor 28.

The arcuate rotor surface 39 may be in frictional contact with the correspondingly shaped surface 37 of the casing section 12, but is preferably spaced slightly therefrom to define a minute constriction therebetween for the reception of the dairy plastic material which serves as a body or medium between the relatively moving surfaces 37 and 39 to create frictional heat. The extent of the constriction may be modified to conform with the required or desired heat of pasteurization through the medium of an adjustable nut 40 in engagement with the upper threaded portion 41 of the shaft 25. A washer 42 is disposed between the nut 40 and the rotor 28 so that rotation of the former will effect the elevation or descension of the rotor 28 on the polygonal extension 27 of the shaft 25.

For this purpose, the extension 27 is somewhat longer than the thickness of the rotor 28, thereby enabling the slidable movement thereof with respect thereto without relieving the rotation of the disc 28 with the shaft 25. It will be apparent that the sleeve 26 is capable of adjustment along the shaft 25 by means of a stud screw 43 extending readily therethrough in threaded engagement therewith to contact with the shaft 25 to enable ready assembling and dismantling of the shaft 25 with respect to the other instrumentalities hereinbefore described. Owing to the high speed rotation of the shaft 25, the nut 40 is held against accidental movement by means of a lock nut 44 in engagement with the threaded portion 41 of the shaft 25 for contact with the nut 40 in the usual locking manner.

It has been found desirable in some instances to provide spirally arranged curved grooves 45 about the periphery of the rotor 28 on the arcuate surface 39 thereof to cooperate with the correspondingly shaped surface 37 of the casing section 12, the grooves 45 being circumferentially spaced at uniform intervals for extension behind the orifice 38 of the hopper 10 to effect initial passage of the plastic particles 46 from the hopper 10. It will be noted that the grooves 45 extend centrally to a point 47 beyond the hopper orifice 38 for communication with the substance confined within the hopper 10, thereby effecting the travel of the plastic substance through the constriction defined between the surfaces 37 and 39 of the casing section 12 and rotor 28, respectively.

Correspondingly formed and similarly directed grooves 48 may be provided in the arcuate surface 37 of the casing section 12 in confronting relation with the grooves 45 to effect the traverse of the plastic substance therethrough. Consequently the substance may pass to the periphery of the rotor 28 even though the surfaces 37—39 are in direct contact for developing heat of pasteurization responsive to the rotation of the rotor 28 with respect to the casing section 12. The substances are subjected to a pressure reaction which in conjunction with the frictional effect of the relatively moving surfaces 37 and 39 through the medium of the cheese constituting the contacting body therebetween, elevates the temperature of the moving substances to a point of pasteurization. The degree of temperature elevation and the maintenance thereof at a predetermined magnitude may be controlled by the distance of the rotor 28 with respect to the casing section 12 responsive to the adjusting of a nut 40 on the threaded portion 41 of the shaft 25.

It is manifest that the plastic substances 46 will traverse the constriction defined by the confronting surfaces 37—39 and perhaps along grooves 45 and 48 should such be provided therein, this being responsive to the rotation of the rotor disc 28, in this instance in a direction indicated by the arrow in Figure 3. During this passage of the plastic particles 46, heat of pasteurization is developed incidental to the rotation of the rotor 28 which also serves to effect movement thereof to its periphery for discharge. It is thus apparent that the use of extraneous heat for pasteurization is entirely avoided, and the processing of the edible plastic in this manner imparts complete homogeneity thereto in that the increments thereof are constantly subjected to a confining pressure precluding disintegration of the constituents and casein separation or any variation in the assimilation of the constituent ingredients thereof. Discharge of the substances from the constriction is effected primarily by the centrifugal urge imparted thereto responsive to the rotation of the rotor disc 28 and the curvature of the grooves 45—48; however, any accumulation thereof on the periphery of the rotor 28 owing to the adhering character thereof is or may entirely be removed by a scraper 49 positioned proximate to the periphery of the rotor 28.

The scraper 49 has a flange 50 attached to receive fasteners 51 therethrough for secural thereof to the interior of the casing section 12 in contact with the rim or periphery 52 of the rotor 28. Rotation of the rotor 28 causes the substances to be discharged therefrom to a container 53 detachably associated with the standard 19 therebeneath owing to the scraper 49. The container 53 is slidable with respect thereto to enable the pasteurized substances to be removed therewith. As shown, the container 53 terminates in a spout 54 for enabling the convenient collection of the mass deposited in the container 53 which rests on a ledge 54¹ formed on the interior of the standard 19. The container 53 is provided with a slot 55 slightly wider than the diameter of the shaft 25 along a median radial line in alignment with the spout 54, thereby enabling the slidable association and removal thereof from the standard 19. The slot 55 is preferably covered with a flap 56 hinged thereto as at 57 to collect the pasteurized substances which may be deposited thereon during the rotation of the rotor 28.

It is worthy of note that the device herein illustrated for processing dairy products may be modified considerably, and the process should not be construed as limited to any mechanism for the performance thereof in that such depends entirely upon the dictates of commercial practice. In view thereof the mechanical structure herein specifically described should be construed as illustrative rather than as a limitation of the process or the invention other than defined in the appended claims.

The plastic substances discharged subsequent to pasteurization will possess a viscous character having the ingredients completely blended owing to the particular processing thereof which creates pressure deformation far superior than thorough kneading. The pasteurized or sterilized product is collected and combined into masses of predetermined size by kneading or preferably natural receptacle mass accumulation, there being a tenacious adherence between the particles comprising the mass owing to the cohesive nature of the viscous discharge and the uniform character thereof. As a consequence the mass is, after cooling and hardening, capable of being severed into segments of the desired size without crumbling or fracture of the remainder thereof, a frequent occurrence in hardened dairy plastics.

The resulting product may be greatly improved in flavor, consistency and preserving qualities by the incorporation of a syrupy constituent therein at any stage in the process of pasteurization. In fact it has been found desirable although not essential to mix the particles of plastic substance such as cheese or butter with syrup, its compounds or derivatives subsequent to the grinding operation, that is prior to its pasteurization, although such could be incorporated therein at any other stage of the process by kneading or otherwise.

In fact any plastic edible substance like butter may be greatly improved in flavor, consistency and keeping qualities even though not pasteurized. This is effected by taking butter direct from the churn and kneading syrup therein. The percentage of syrup may be varied depending upon the desired flavor or the preserving qualities which is to be imparted thereto. In the instance of butter, it has been found that 2 to 10% syrup, by weight, may be advantageously employed to impart a velvety consistency and improved flavor thereto depending upon the individual taste of the consumer and the other qualities desired. Corn syrup, honey, and its kindred compounds may be advantageously employed for this purpose, for this constituent may be varied depending on the factors of preservation, and flavor desired in dairy products.

In combination with the salt either inherent in commercial butter or kindred dairy products, the syrup imparts a very desirable flavor blend. If desired, Rochelle salt serves admirably in combination therewith for enhancing the flavor in conjunction with the syrup. For this purpose, the addition of 2% (by weight) Rochelle salt is preferred, though not essential either in that proportion or in any quantity.

The sugar constituent of the syrup together with ordinary salt inherent in butter or the Rochelle salt added thereto serve as a preservative enhancing the keeping qualities thereof for extended periods without deterioration. The viscous nature of syrup imparts a velvety consistency to the resulting product, thereby rendering it more desirable from a standpoint of consumption. The sugar constituent of syrup is especially effective in imparting a desirable flavor which is unattainable when combined in its free state with butter, since sweet butter is lacking in salt and possesses little resistance to deterioration. The resulting product is thus far superior than commercial butter taken directly from the churn or subsequent to pasteurization in the customary manner.

It will be observed that vegetable and syrupy flavors of every description may be employed for the purpose herein set forth and the use of the term syrup should be broadly construed to cover allied products. Pasteurization without resort to extraneous heat is especially productive of an improved product; since the ingredients incorporated therein are homogeneously distributed through and uniformly blended in the resulting mass owing to the pressure reaction thereon.

Various changes may be made in the embodiment of the invention herein specifically described without departing from or sacrificing any of the advantages thereof as defined in the appended claims.

I claim:

1. A process of pasteurizing edible dairy plastic substances such as cheese which consists in the subjection thereof to a pressure reaction culminating in heat of sterilization, continuing the subjection of said cheese to the heat of sterilization for a sufficient time to secure a pasteurized product, and then forming a mass from the resulting product.

2. A process of pasteurizing edible dairy substances of a plastic character which consists in the subjection thereof to a friction reaction for effecting the temperature elevation thereof to a pasteurization point, continuing the frictional subjection of the dairy substances to effect the pasteurization thereof, and then creating masses therefrom of predetermined size.

3. A process of pasteurizing plastic dairy edibles without extraneous heat which consists in effecting the traverse of edible dairy plastic substances between confining surfaces to develop heat of pasteurization in consequence thereof, continuing the traverse of the substances for conversion into a melted pasteurized substance, and then discharging the melted substance for forming predetermined masses of the substances.

4. A process of sterilizing cheese without extraneous heat which consists in effecting the traverse of edible particles of said cheese between relatively moving confronting surfaces in contact therewith to effect the subjection thereof to the resulting frictional heat of pasteurization for a period of time sufficient to render the cheese permanently keeping.

5. A process of sterilizing edible dairy plastics without extraneous heat which consists in effecting the traverse of edible particles of said plastic substances between relatively moving confining pressure surfaces to effect the subjection thereof to the resulting frictional heat of pasteurization, and then discharging the substances reduced to a viscous state for combination into masses of predetermined size.

6. A process of pasteurizing cheese which consists in shredding the cheese into particles, then effecting the passage thereof between relatively movable confining walls serving as a constriction effective thereon in elevating the temperature, subjecting the cheese to the resulting temperature for a sufficient time to effect the pasteurization thereof prior to discharge.

7. A method of rendering edible diary plastic substances permanently keeping, which consists in effecting the confinement thereof under pressure culminating in sterilization temperatures without supplying extraneous heat, and maintaining the pressure confinement until sterilization of the dairy substance is effected.

8. A process of rendering edible dairy substances permanently keeping without resort to extraneous heat, which consists in subjecting small successive increments of the edible dairy plastics to a high degree of pressure culminating in heat of sterilization, continuing the subjection of the dairy substances to the developed heat of sterilization for a period sufficient to render such permanently keeping and impart fluidity thereto, and then pouring the resulting fluid substances into containers for packaging.

JOHN H. BAUMGARTNER.